J. W. FAXON.
Cocks.
No. 143,683.              Patented Oct. 14, 1873.
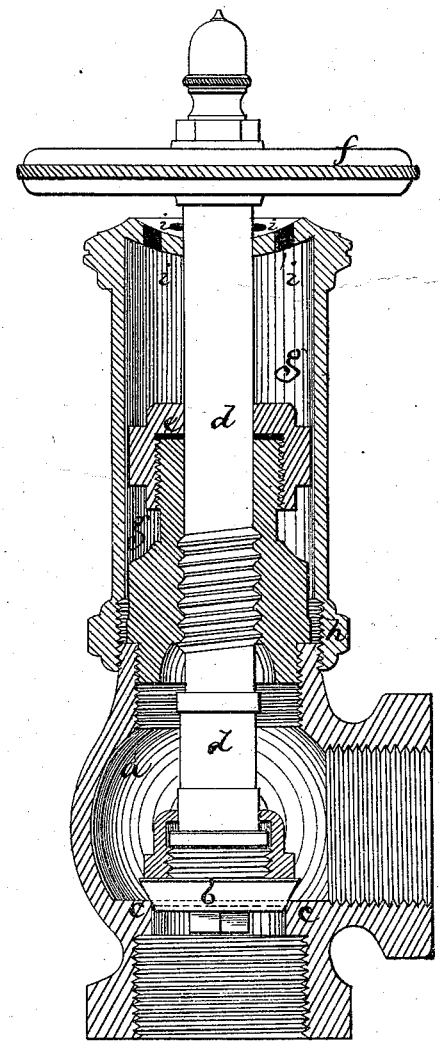
Witnesses.
M. W. Frothingham.
L. H. Latimer.
Inventor.
James W. Faxon.
By his Attys.
Crosby & Gould

UNITED STATES PATENT OFFICE.

JAMES W. FAXON, OF BOSTON, MASSACHUSETTS.

IMPROVEMENT IN COCKS.

Specification forming part of Letters Patent No. 143,683, dated October 14, 1873; application filed September 25, 1873.

*To all whom it may concern:*

Be it known that I, JAMES W. FAXON, of Boston, in the county of Suffolk and State of Massachusetts, have invented an Improved Cock; and I do hereby declare that the following, taken in connection with the drawings which accompany and form part of this specification, is a description of my invention sufficient to enable those skilled in the art to practice it.

In using steam-cocks, especially in connection with a heating apparatus, or in places where cleanliness and neatness are particularly desirable, much annoyance is caused by escape of steam through the packing-box, through which the valve-spindle passes, and its condensation and the drip of water over the sides of the cock, and upon the floor or carpet of the room.

My invention has for its object the remedy of this difficulty, and to accomplish the object I combine with the cock an encompassing-chamber, which incloses the top part of the cock, and especially the stuffing-box, this chamber receiving the escaping steam and water of condensation, and by its heat insuring the evaporation of the water, and preventing any deposit of it upon the exterior of the cock, or any dripping of water from it. My invention consists in the combination of such chamber with a steam-cock. or with any other cock, in which, by pressure, water or steam escapes from the stuffing-box or valve-tube.

The drawing represents in sectional elevation a steam-cock embodying my invention.

$a$ denotes the main body and valve-chamber; $b$, the valve; $c$, the valve-seat; $d$, the vertical valve-spindle. The spindle extends through a stuffing-box, $e$, and is surmounted by a wheel, $f$, by turning which the spindle is rotated to open and close the valve. Although a suitable stuffing is placed between the stuffing-box and spindle, steam escapes by the spindle, and, condensing, defaces the surface of the cock, to remedy which, and the drip of the water, I place upon the cock the hollow cylinder chamber or cup $g$, preferably coupling the cylinder to the cock by a screw-threaded connection, as seen at $h$. The spindle extends through this chamber, but the escaping steam or water enters the chamber, and is retained therein and thereby until it escapes by evaporation, to facilitate which the top of the chamber may be provided with apertures $i$. By means of this chamber the whole exterior surface of the cock will be at all times untarnished by steam or water, and dripping of water of condensation will be wholly obviated. The chamber $g$ may be provided with a draw-off or drip-pipe extending from it at its bottom; but I prefer the specific construction shown.

I claim—

The cup or chamber $g$, in combination with the valve or cock and its vertical spindle $d$.

JAMES W. FAXON.

Witnesses:
 FRANCIS GOULD,
 GEO. H. WALKER.